(12) United States Patent
Seo

(10) Patent No.: US 7,209,487 B2
(45) Date of Patent: Apr. 24, 2007

(54) HIGH-SPEED WIRELESS DATA COMMUNICATION CARD DEVICE FOR SIMULTANEOUS DATA/VOICE COMMUNICATIONS

(75) Inventor: Jeong-Hyun Seo, Seoul (KR)

(73) Assignee: Eun-Bok Lee (KR)

( * ) Notice: Subject to any disclaimer, the term of this patent is extended or adjusted under 35 U.S.C. 154(b) by 1079 days.

(21) Appl. No.: 10/284,950

(22) Filed: Oct. 31, 2002

(65) Prior Publication Data

US 2003/0179724 A1 Sep. 25, 2003

(30) Foreign Application Priority Data

Mar. 21, 2002 (KR) .............................. 2002-15448

(51) Int. Cl.
*H04J 3/14* (2006.01)
(52) U.S. Cl. ..................... 370/401; 455/557; 455/560
(58) Field of Classification Search ................ 370/401; 455/557, 560
See application file for complete search history.

(56) References Cited

U.S. PATENT DOCUMENTS

| | | | | |
|---|---|---|---|---|
| 5,889,816 A | * | 3/1999 | Agrawal et al. | ............. 375/220 |
| 6,654,616 B1 | * | 11/2003 | Pope et al. | ............... 455/556.1 |
| 6,785,556 B2 | * | 8/2004 | Souissi | ........................ 455/557 |
| 6,915,142 B1 | * | 7/2005 | Wietfeldt | ..................... 455/557 |
| 6,928,301 B2 | * | 8/2005 | Souissi et al. | ............... 455/557 |
| 7,110,444 B1 | * | 9/2006 | Sorrells et al. | ............. 375/222 |
| 2005/0089052 A1 | * | 4/2005 | Chen et al. | .................. 370/401 |

* cited by examiner

*Primary Examiner*—Hassan Kizou
*Assistant Examiner*—Jay P. Patel
(74) *Attorney, Agent, or Firm*—Cantor Colburn LLP

(57) ABSTRACT

A high-speed wireless data communication card device for simultaneous data/voice communications is provided. The card device includes a wireless LAN module for performing data communication over a wireless LAN, the wireless LAN module including a first PCMCIA interface, a CDMA module for performing wireless data communication over a mobile communication network, the CDMA module including a serial communicator and a universal interface bus, and a second PCMCIA interface for interfacing with an external apparatus according to a PCMCIA protocol, a signal converter for converting a format of data outputted from the CDMA module into a PCMCIA format and the PCMCIA format of input data of the CDMA module into a serial bus format, respectively, a switch for transferring CDMA data of the signal converter or wireless LAN data of the wireless LAN module to the second PCMCIA interface, a controller for controlling an operation of the switch in response to a switching control signal of the second PCMCIA interface, an ear-microphone connected to the CDMA module for transmitting and receiving voice data, an antenna connected to the CDMA module and wireless LAN module for transmitting and receiving a RF signal, and a filter for filtering RF signals received by the antenna to be processed in the CDMA module and wireless LAN module.

5 Claims, 2 Drawing Sheets

HIGH-SPEED WIRELESS DATA COMMUNICATION CARD DEVICE FOR SIMULTANEOUS DATA/VOICE COMMUNICATIONS

BACKGROUND OF THE INVENTION

1. Field of the Invention

The present invention relates to a high-speed wireless data communication card device for simultaneous data/voice communications.

2. Description of the Related Art

A mobile communication terminal, such as a portable computer or personal digital assistant (PDA), is transmits and receives data wirelessly using a CDMA (Code Division Multiple Access) mobile communication method, a wireless LAN (Local Area Network) communication method or etc.

The CDMA method has an advantage in that wireless data communication can be performed over long distances to far-away regions through the use of national network facilities. The wireless LAN method is advantageous in that a network usage fee is low and data is transferred at a high data rate of 11 Mbps.

However, the CDMA method is disadvantageous in that a network usage fee is high and data is transmitted and received at a lower data rate of 144 Kbps~2 Mbps than that of the wireless LAN method, resulting in inconvenience to a user. Moreover, the wireless LAN method has a disadvantage in that data can be transmitted and received only within a limited range, namely, the data transmission/reception is subject to limitations in distance and region. Furthermore, a conventional wireless data communication user has to change and use a wireless data communication card containing a mobile communication module of a CDMA type and a wireless data communication card containing a wireless LAN module of a wireless LAN type, resulting in an increased economic burden.

One approach to the above problems is shown in Korean Patent Application No. 10-2001-74609 (entitled "CARD DEVICE FOR WIRELESS DATA COMMUNICATION"), invented and filed by this inventor.

The above wireless data communication card device comprises a wireless LAN module and mobile communication module in an integrated manner, thereby performing a CDMA wireless data communication method and a wireless LAN data communication method in a single terminal. Therefore, this card device can solve the inconvenience of changing and inserting each wireless data communication card in a portable computer or PDA.

However, the wireless data communication card device is inconvenient to use in that the CDMA module cannot be used while data communication is performed through the wireless LAN module, and the wireless LAN module cannot be used while data communication is performed through the CDMA module. In particular, the CDMA module is able to support voice communication as well as data communication. In this regard, there is a need for a wireless data communication card device capable of performing voice communication through the CDMA module at the same time as data communication through the wireless LAN module.

SUMMARY OF THE INVENTION

Therefore, the present invention provides a high-speed wireless data communication card device for simultaneous data/voice communications capable of performing voice communication through a CDMA module wireless data communication through a wireless LAN module at the same time.

In accordance with the present invention, a high-speed wireless data communication card device for simultaneous data/voice communications, comprises a wireless LAN (Local Area Network) module for performing data communication over a wireless LAN, the wireless LAN module comprising a first PCMCIA (Personal Computer Memory Card International Association) interface, a CDMA (Code Division Multiple Access) module for performing wireless data communication over a mobile communication network, the CDMA module comprising a serial communicator and a universal interface bus, and a second PCMCIA interface for interfacing with an external apparatus according to a PCMCIA protocol, a signal converter for converting a format of data outputted from the CDMA module into a PCMCIA format and the PCMCIA format of input data of the CDMA module into a serial bus format, respectively, a switch for transferring CDMA data of the signal converter or wireless LAN data of the wireless LAN module to the second PCMCIA interface, a controller for controlling an operation of the switch in response to a switching control signal of the second PCMCIA interface, an ear-microphone connected to the CDMA module for transmitting and receiving voice data, an antenna connected to the CDMA module and wireless LAN module for transmitting and receiving a radio frequency (RF) signal, and a filter for filtering RF signals received by the antenna to be processed in the CDMA module and wireless LAN module.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
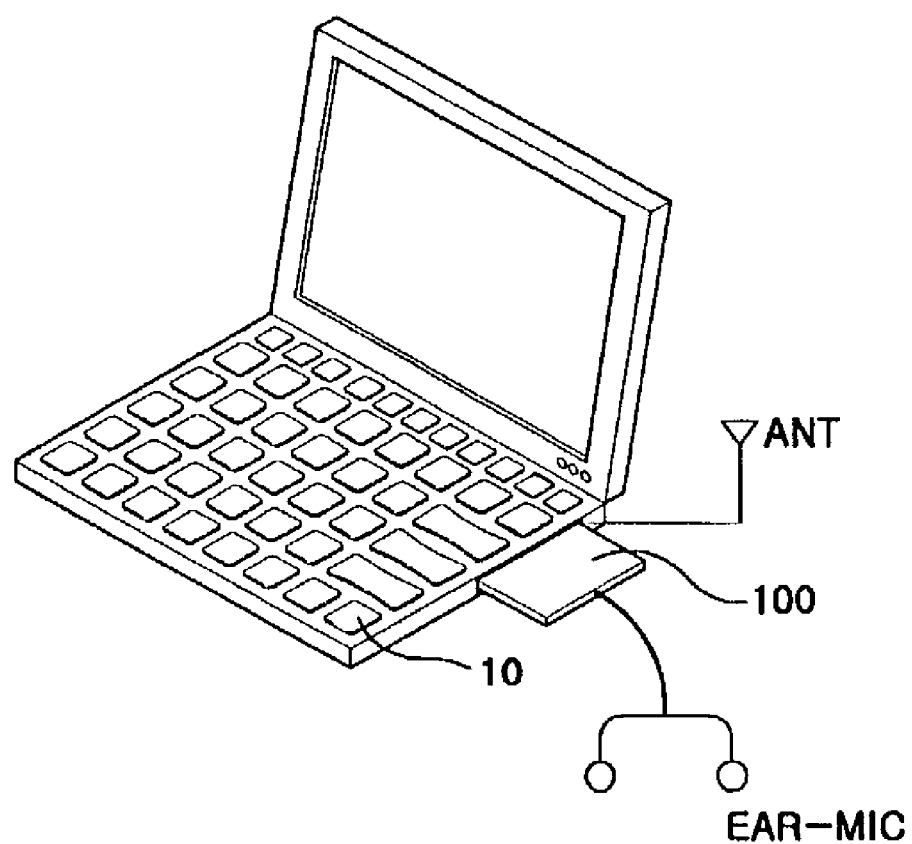
FIG. 1 is a perspective view showing a high-speed wireless data communication card device for simultaneous data/voice communications mounted on a portable computer, according to the present invention.

FIG. 1 is a perspective view showing a high-speed wireless data communication card device 100 for simultaneous data/voice communications mounted on a portable computer 20, according to the present invention.

In an exemplary embodiment of the present invention, the portable computer 10 transmits and receives data to/from the wireless data communication card device 100 according to a PCMCIA (Personal Computer Memory Card International Association) bus protocol and has a device driver installed therein for driving the card device 100. An antenna ANT transmits and receives signals of frequencies available for CDMA communication and wireless LAN communication. At this time, a wireless data communication user can conduct voice communication through an ear-microphone EAR-MIC connected to the wireless data communication card device 100 while conducting data communication through the portable computer 10 comprising the card device 100.

Figure 2:
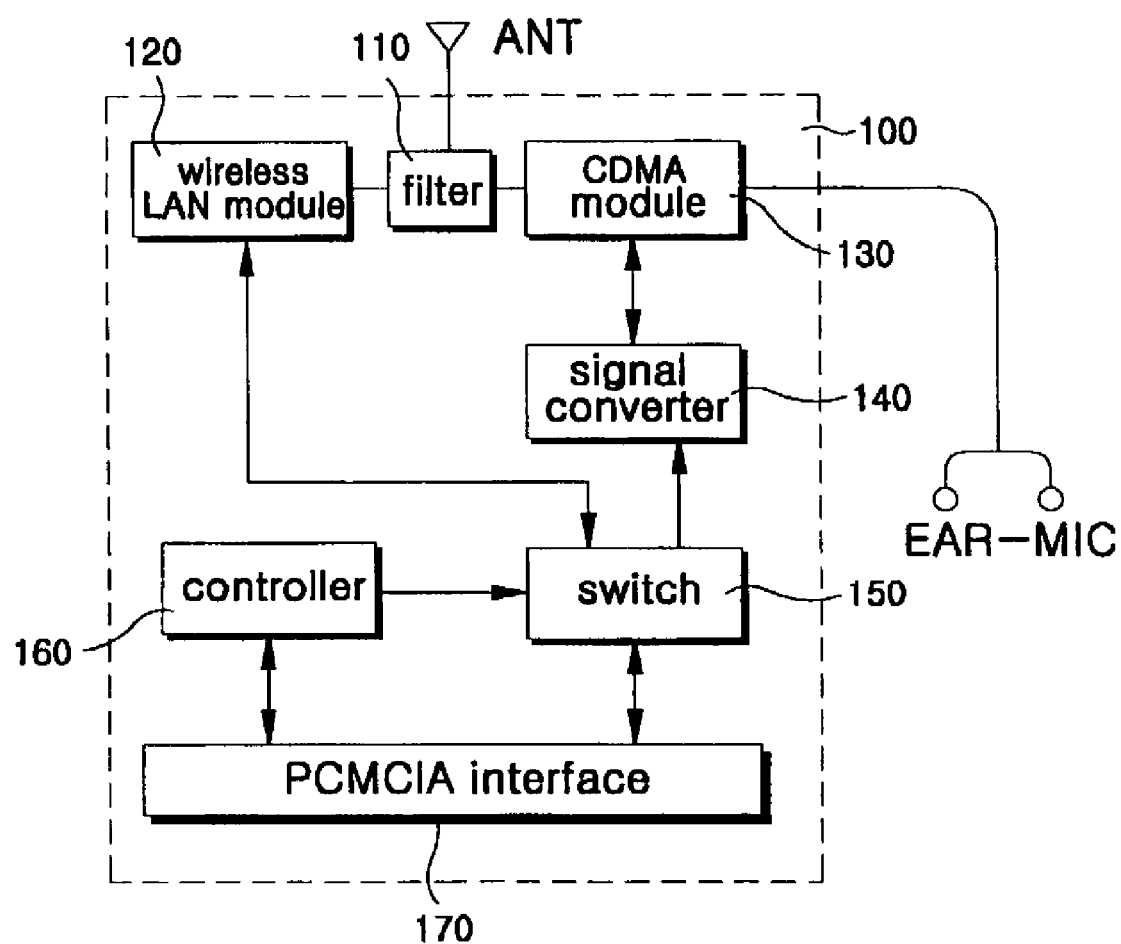
FIG. 2 is a block diagram schematically showing a high-speed wireless data communication card device for simultaneous data/voice communications according to the present invention.

A detailed description will hereinafter be given of the high-speed wireless data communication card device for simultaneous data/voice communications according to the present invention with reference to FIG. 2. FIG. 2 is a block diagram showing the high-speed wireless data communication card device for simultaneous data/voice communications according to the present invention.

As shown in FIG. 2, the high-speed wireless data communication card device 100 for simultaneous data/voice communications comprises an antenna ANT, a filter 110, a wireless LAN module 120, a CDMA module 130, a signal converter 140, a switch 150, a controller 160, and a PCMCIA interface 170. The PCMCIA interface 170 interfaces with the computer 10 according to a PCMCIA protocol.

The antenna ANT transmits and receives radio frequency (RF) signals at about 860 MHz band for CDMA communication, at about 1.7 GHz band for PCS (Personal Communication Service) communication and at about 2.4 GHz band for wireless LAN communication. As a result, in an exemplary embodiment of the present invention, it is possible to transmit and receive data through the CDMA module and wireless LAN module through the use of only one antenna.

The filter 110 filters RF signals received by the antenna ANT to be processed in the CDMA module or wireless LAN module.

The wireless LAN module 120 includes a first PCMCIA interface for converting the format of the data outputted from the filter 110 into a PCMCIA format. The wireless LAN module 120 may be, for example, an ISL 3873 chip commercially available from Intersil™ Corporation, which is well known to those skilled in the art and a detailed description of which will thus be omitted.

The CDMA module 130 includes a CDMA processor, a universal interface bus and a serial communicator. The serial communicator transfers the data processed by the CDMA processor to a portable computer or PDA coupled with the card device 100. To this end, the serial communicator includes a UART (Universal Asynchronous Receiver/Transmitter) serial communicator and a USB (Universal Serial Bus) serial communicator.

The CDMA module 130 may be, for example, an MSM 5105 chip commercially available from Qualcom™ Inc., which is well known to those skilled in the art and a detailed description of which will thus be omitted.

The signal converter 140 converts the format of the data outputted from the universal interface bus or serial communicator of the CDMA module 130 into the PCMCIA format. The signal converter 140 further converts the PCMCIA format of input data of the CDMA module 130 into a serial bus format.

The switch 150 selectively transfers the data outputted from the signal converter 140 and the data outputted from the first PCMCIA interface of the wireless LAN module 120 to the second PCMCIA interface 170 in response to a selection signal of the controller 160.

The controller 160 generates the selection signal in response to a switching control signal of the second PCMCIA interface 170 to control the operation of the switch 150.

Now, a description will be given of the operation of the high-speed wireless data communication card device for simultaneous data/voice communications with the above-stated construction according to the present invention.

If the high-speed wireless data communication card device for simultaneous data/voice communications is mounted on a mobile communication terminal such as a portable computer or PDA, the wireless data communication card device and the portable computer comprising the wireless data communication card device perform their respective initialization operations of driving their respective device drivers to conduct wireless data communication. These initialization operations are well known to those skilled in the art and a description thereof will thus be omitted.

If the initialization operations are completed, the portable computer displays an initial screen for allowing a user to select anyone of a wireless LAN communication mode, a CDMA communication mode and a simultaneous wireless LAN/CDMA communication mode.

If the user selects one of the communication modes, the portable computer operates an application program for executing the selected communication mode.

In the case where the user selects the simultaneous wireless LAN/CDMA communication mode, the portable computer first operates an application program for wireless LAN communication, thereby enabling the user to conduct data communication. At this time, if the user desires to conduct voice communication through the CDMA module, the portable computer operates an application program for the voice communication and the user enters another party's telephone number. The entered telephone number is RF-processed by the CDMA module and then transmitted to a base station through the antenna. The subsequent series of procedures are performed via a plurality of base stations and exchanges, and they are well known in a mobile communication field and a detailed description thereof will thus be omitted. If a call connection is established, the wireless data communication user conducts the voice communication through the ear-microphone.

As apparent from the above description, with a portable computer comprising a wireless data communication card device according to an exemplary embodiment of the present invention, a user performs voice communication simultaneously with wireless data communication, resulting in an increase in the convenience of use.

Further, according to the present invention, the user can conduct the wireless data communication at a lower cost.

Furthermore, according to the present invention, the user can utilize a wireless data communication network more effectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-speed wireless data communication card device for simultaneous data/voice communications, comprising:

a wireless LAN (Local Area Network) module for performing data communication over a wireless LAN, said wireless LAN module comprising a first PCMCIA (Personal Computer Memory Card International Association) interface;

a CDMA (Code Division Multiple Access) module for performing wireless data communication over a mobile communication network, said CDMA module comprising a serial communicator and a universal interface bus; and a second PCMCIA interface for interfacing with an external apparatus according to a PCMCIA protocol;

a signal converter for converting a format of data outputted from said CDMA module into a PCMCIA format and the PCMCIA format of input data of said CDMA module into a serial bus format, respectively;

a switch for transferring CDMA data of said signal converter or wireless LAN data of said wireless LAN module to said second PCMCIA interface;

a controller for controlling an operation of said switch in response to a switching control signal of said second PCMCIA interface;

an ear-microphone connected to said CDMA module for transmitting and receiving voice data;

an antenna connected to said CDMA module and wireless LAN module for transmitting and receiving radio frequency (RF) signals; and a filter for filtering a RF signal received by said antenna to be processed in said CDMA module and wireless LAN module.

2. The high-speed wireless data communication card device as set forth in claim 1, wherein said antenna transmits and receives the RF signal at about 860 MHz band.

3. The high-speed wireless data communication card device as set forth in claim 1, wherein said antenna transmits and receives the RF signal at about 1.7 GHz band.

4. The high-speed wireless data communication card device as set forth in claim 1, wherein said antenna transmits and receives the RF signal at about 2.4 GHz band.

5. The high-speed wireless data communication cared device as set forth in claim 1, wherein the external apparatus comprises a computer.

* * * * *